Figure 1:
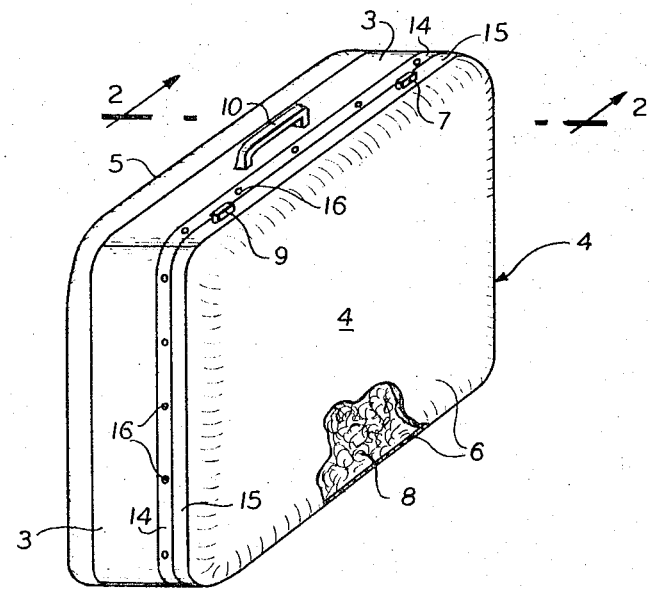

Aug. 15, 1967 R. HOFFERBERT 3,335,827
SHAPED ARTICLES AND METHOD OF PRODUCING SAME
Filed Nov. 17, 1964

INVENTOR
RAYMOND HOFFERBERT
BY
Burgess, Dinklage & Sprung
ATTORNEYS.

United States Patent Office 3,335,827
Patented Aug. 15, 1967

3,335,827
SHAPED ARTICLES AND METHOD OF
PRODUCING SAME
Raymond Hofferbert, Lowell, Mass., assignor to Pellon
Corporation, New York, N.Y., a corporation of New
York
Filed Nov. 17, 1964, Ser. No. 411,820
8 Claims. (Cl. 190—53)

This invention relates to the production of shaped articles, and, more particularly, to the production of such articles wherein the foundation for the form of the article is provided by an impregnated non-woven fleece.

While the invention has application in general to the production of shaped articles, the production of luggage shells is particularly contemplated. Accordingly, the invention will be described in detail with reference to such use.

The dish-shaped shells which are hinged together and further outfitted with suitable hardware to provide luggage cases, are commonly of either rigid or soft-sided construction. The rigid construction has the advantage that the shells can be formed of a single piece of material. Thus, in the case of metal shells, stamping can be used to provide the desired shape, and in the case of rigid plastic shells, molding techniques can be used. One piece construction for the shells is highly desirable in that very substantial savings are realized since it is not necessary to assemble a number of individual parts to provide the shell form. On the other hand, the rigid construction has the disadvantage in that the shells are susceptible to permanent deformation, as may happen in the case of metal shells, or to cracking, as may happen in the case of rigid plastic shells.

Soft-sided luggage shells are formed by assembling together individual sheets, as by sewing, to build up the shell shape desired. The material can be a non-shape retaining material so that such shape as the shell maintains is due to the influence of the various parts of the shell on one another. Alternatively, the soft-sided shells can be formed of material which is shape-retaining, so that the shape-retaining character of the material as well as the interconnection of the various pieces thereof serves to provide the shell form. Where the material is shape-retaining, it has sufficient flexibility, yieldability and resilience so that it is neither permanently deformed or damaged by cracking upon being subjected to abuse as is normal in the use of such goods.

Whereas the soft-sided luggage permits avoidance of the disadvantages of susceptibility to permanent deformation and cracking, yet, as is indicated above, such luggage has the disadvantage of high assembly cost. There are also limitations on style designs.

It is known to produce shaped articles of non-woven fleece material impregnated with a binder. The invention involves the concept of using a material in sheet form impregnated with a vulcanizable or curable binder material, and molding the binder impregnated goods to the shape desired. Such a procedure can be utilized to provide a soft-sided luggage having flexibility, yieldability, and resilience as is described above and, hence, has highly desirable characteristics for the production of many shaped articles. A particular advantage of construction as discussed here is that the articles can be contoured in many planes so that great variety in shape is practical. This has special significance in the production of luggage since a wide variety of possible corner designs is desirable in such goods.

In the case of the fleeces impregnated with vulcanizable or curable binder, a problem exists, however, in that, in general, the impregnated fleece in sheet form cannot be stored for any substantial length of time since during storage, the vulcanization process may occur to the extent that the material is rendered unsuitable for the intended subsequent processing.

It is a principal object of the invention to provide a non-woven sheet material impregnated with a polymer composition which is amenable to molding to provide a shaped article, and which can be stored for a substantial period of time prior to usage in the production of the shaped articles.

It has been found that non-woven fleeces impregnated with certain known polymers, following storage, can be molded to form shaped articles of the type which is the concern of the invention. Representative of these polymers are the so-called carboxy modified butadiene styrene copolymers. Non-woven sheet material can be impregnated with such polymers and can be provided in a dry stable condition having good shelf life permitting storage and shipment prior to molding to produce shaped articles therefrom. The sheet material impregnated with such polymer, without the addition of a curing or vulcanizing agent, following the storage, can be subjected to a molding operation.

The invention contemplates the production of shaped articles, for example, luggage shells, by the following procedure: a non-woven fleece of filament material in the form of a sheet, can be impregnated with an aqueous latex of a polymer of, for example, the type mentioned. The impregnated fleece can then be dried to evaporate water therefrom and deposit the polymer therein as a binder securing the filaments of the fleece together. Desirably, prior to the drying, the fleece is squeezed between rolls to provide a sheet in which the filament material is compacted. Following the drying, the fleece containing the binder can be cooled to ambient temperature and it can be maintained at ambient temperature for a period of time appropriate for storage and shipment from the point of production to the point of use. Thus, the impregnated sheet material can be stored for a period of weeks without any change occurring therein as is significant with respect to the intended use of the sheet. As such time as is desired, the impregnated sheet can be subjected to pressure to form therefrom the shape desired. Such shape can be maintained by utilization of pressure and during such time, heat can be applied to cure the binder to provide the shaped article composed of the sheet and cured binder, the composite being bent to provide the shape desired and being in stable condition, following the curing.

Thus, the invention provides a shaped article having as a shape-defining element a non-woven filamentary fleece, stable in form and bent to impart the shape. The fleece comprises a heat cured polymer serving as a binder for the fleece filaments and as a stiffening agent imparting the shape of the article thereto. The polymer composition contained in the fleece, in uncured condition, is preferably dispersable in water for application to the fleece and is amenable to drying treatment to deposit the polymer composition in the fleece from a water emulsion, and in uncured, dry condition dispersed in the fleece, is suitable for storage of the fleece containing polymer composition at ambient conditions.

The non-woven fibrous material may be based on or be composed of any fiber or fiber mixtures of various types, and compositions which are ordinarily used in the non-woven fabric art. Examples are vegetable fibers such as cotton, ramie, flax, jute, animal fibers such as wool and other animal hair or human hair, or synthetic fibers such as viscose, acetate, polyamide, superpolyamide, polyvinyl chloride, polyethylene, polypropylene, polyvinyl alcohol, polyvinylidene chloride, polyester, polyacrylonitrile, fibers consisting of co-polymers of several fiber-forming monomeric compounds, protein fibers, alginate fibers, mineral fibers, such as glass or asbestos, and any of other naturally occurring or synthetic fibrous materials known to those skilled in the art. Also mixtures of two or more fibers, such as those noted above, may be used.

The fibers can be, and preferably are in cardable form. Their length can be and is generally about .8 cm. to 8 cm., preferably about 2 to 6 cm.

The fibrous fleece can be formed by running the fiber or blended fiber mix through a Rando Webber one or more times, and needling the fibrous mat to compact or densify it and also to strengthen it for subsequent handling operations.

A preferred method of manufacturing fibrous fleece is as follows:

The fiber or fiber mixtures are formed on a carding machine into thin, loose, fibrous webs having a weight of about 15 to 35 gms. per square meter. A number of such webs, for instance 3 to 20, are placed upon one another and subjected to a suitable pressure to produce fleeces of the desired thickness which may have a weight of about 40 to 500 gms. or more per square meter. In order to give the fleeces equal resistance against stresses in both machine and across machine directions, the thin webs, the fibers of which have been partially aligned in the machine direction by the carding operation, are placed upon one another at an angle in such a manner that the fibers of adjacent layers cross each other and a fleece is formed in which the fibers are superimposed in various directions.

The polymer compositions for practice of the invention are heat curable materials, as by crosslinking, such as thermosetting resins, which will serve as a binder for the filaments of the fleece and as stiffening agent imparting the shape of the articles formed. Characteristically, the polymer composition in uncured condition dispersed in the fleece is stable so that the fleece, containing the polymer composition, can be stored at ambient conditions. Further, the polymer composition is preferably dispersable in water for application to the fleece and is amenable to drying treatment to deposit the composition in the fleece from a water emulsion, whereby deposit of the polymer composition is facilitated. The polymer in cured condition is desirably resistant to solvents and fluids, including of course, water, so that the shaped article is suitable for varied conditions as may be encountered in use.

The polymer composition can be any of the known carboxy modified butadiene, styrene polymers. Butadiene styrene copolymers are of early date in the plastics art and are well known for their application as films. In the progress of the art, such polymers modified with an unsaturated carboxylic acid were prepared and the modified polymers attained substantial industrial importance to the point where they are offered by several firms in a wide variety of formulations and for varied uses, most notable among which are as carpet backing and upholstery backing.

While the best known of the polymers is a polymer of unsaturated carboxylic-acid, butadiene, and styrene, a broader range of monomer components is possible. Thus, not only butadiene but aliphatic conjugated diolefins in general are suitable. The diolefin can contain about 4–9 carbon atoms and examples of suitable materials are butadiene - 1,3,2-methyl-butadiene-1,3,2,3-dimethylbutadiene-1,3, piperylene, 2-neopentyl-butadiene-1,3, and other hydrocarbon homologs of butadiene-1,3, and in addition the substituted dienes, such as 2-chlorobutadiene-1,3, 2-cyanobutadiene-1,3, the substituted straight chain conjugated pentadienes, the straight and branch chain hexadienes, and others having from 4 to about 9 carbon atoms. Butadiene-1,3 is preferred.

With respect to styrene, alkenyl aromatic monomers in general are suitable, and instead of styrene or other alkenyl aromatic monomers, acrylonitrile or alkyl substituted acrylonitrile can be used. Monovinyl aromatic monomers such as styrene are well suited. Included among such materials are those monomers wherein a vinyl group is attached directly to an aromatic nucleus containing from 6 to 10 carbon atoms. Those monomers are intended to include alkyl- or halo-substituted compounds. Typical of these monomers are para-methyl styrene, meta-ethyl styrene, ortho-para-dimethyl styrene, ortho-paradiethyl styrene, para-dichlorostyrene. All or part of the monovinyl aromatic monomers can be replaced by acrylonitrile, or a substituted acrylonitrile, for example lower alkyl substituted acrylonitrile.

The carboxy modification need not necessarily be with a carboxylic acid monomer. In general, it can be effected with acids of the class ethylenically unsaturated acids, and such acid can be a carboxylic acid or a sulfonic acid.

The acid used should be copolymerizable with the other monomers. Acids which can be used are: itaconic acid, acrylic acid, vinyl sulphonic acid, vinyl benzoic acid, and isopropenyl benzoic acid. All or part of the acid can be dicarboxylic; for example maleic, fumaric, and, as mentioned previously, itaconic.

With respect to the relative proportions of the moieties of the polymer, based on monomer, the weight proportion can be about 30–50% butadiene or other diene, about 48–68% styrene or other alkenyl aromatic monomer, and about 2–20% ethylenically unsaturated acid.

The polymers are well known materials, and suitable compositions are described in British Patents 873,876 and 952,219, and in publications entitled "Tech Book Facts, Pliolite Latex 440" and "Tech Book Facts, Pliolite Latex 460," both published by Chemical Division, the Goodyear Tire & Rubber Company, Akron 16, Ohio; Plastics Development and Service, Experimental Product Technical Data Sheet, Experimental Latex QX–3367.1 For Textile Application, Apr. 12, 1962, published by The Dow Chemical Company, Midland, Mich.; Hycar Rubber and Latex, Hycar Latex Newsletter, Issue No. 21, January 1962, published by B. F. Goodrich Chemical Company; Ucar Latex 890, Advance Technical Information, 41033, July 1963, published by Union Carbide Corporation, Chemical Division. At least one of the polymers suitable for the practice of the invention has been used in the prior art as a binder for non-woven fleece.

The polymers are in the form of latexes and can include surfactant and antixodant. The polymer content of the latex can be as is the practice with respect to such compositions, e.g. about 20–50% polymers. Zinc oxide can be included, as is known for the Hycar materials referred to above. Such binder compositions are available commercially. It has been found that advantage is realized by including in such compositions a thickening agent to impart thereto a viscosity such that the pick-up of the binder composition by the fleece is improved. For example, a 2% solution of sodium alginate can be added to the commercially available latex, in the amount of up to about 20% of the basic latex. Also, an alkaline material, for example, ammonia or potassium hydroxide can be added in small amounts, for example, less than about 1%. In particular, where zinc oxide is included in the latex, alkalinity as mentioned is desirable in that improved cure is then realized and the product will be more fully cured.

While the modified butadiene styrene type polymers discussed above are well suited for the purposes of the invention, as indicated previously, other polymers meeting the requirements of the invention can be used. Thus reactive acrylics as described in American Dyestuff Reporter, Sept. 2, 1963, pp. 43–47 can be used. Polymers having reactive groups such as methacrylic acid, itaconic acid, acrylamide and hydroxy pentylvinyl ether residues. Other polymers and polymer compositions stable at ambient conditions so as to permit storage and curable as by cross linking can be used.

The impregnation can be effected in known manner. Dipping can be utilized. Further, the application of the binder as a foam can be practiced and both foam application and dipping can be employed. Multiple binder applications can be used, with intermediate drying steps. Preferably, the impregnation is in a manner to provide thorough and uniform impregnation of fleece. The fleece can be squeezed between rolls before the drying and during the impregnation to provide a compacted material. Calendering as would provide excessive compacting is undesirable insofar as it imparts a stiffness to the material a would interfere with the shaping during the molding operation.

The weight proportion of fiber to polymer composition can in the range of about 1:1 to about 1:6, and is preferably in the range of about 1:1 to about 1:2.5. A smaller proportion of binder can be used, for example, a fiber to binder proportion of about 1:0.1, but in general best results are obtained by utilization of a larger proportion of binder. The amount of binder can be in excess of 1:6, for example 1:10. The higher ratios can be obtained by utilization of multiple dipping treatment, with intermediate drying. Preferably, two dips, with intermediate drying, are utilized to provide a proportion of fiber to binder of about 1:1 to about 1:2. In percentage by weight the binder can be about 10–90% of the combined fleece and binder.

The drying, following the impregnation with binder, is for the purpose of expelling water and depositing the binder in the fleece. Any convenient procedure can be utilized. The material should be dried to the extent that it can be rolled without sticking together of the interface. Excessive drying should be avoided since following the evaporation of water, vulcanization or curing will commence, and such phenomenon is relied upon for the subsequent shaping operation and the occurrence thereof prior to shaping will render the material unsuitable for the production of shaped articles as is contemplated by the invention. For the drying, a drying time in the order of minutes, for example about 3–4 minutes, at heating temperatures of about 220–270° F. Desirably this drying is conducted at atmospheric pressure so that the temperature of the fleece does not exceed about 212° F. The dried fleeces can be stored at ambient conditions for a period of weeks without the occurrence of vulcanization or curing as detracts from their suitability for the production of shaped articles as is contemplated by the invention.

For the production of the shaped articles, the fleeces in dried condition and containing the binder are preferably subjected to a preheating or steaming to render the fleece pliable and amenable to the shaping thereof. A male-female mold can be used for the shaping operation and such a mold can be outfitted with means for heating the goods while pressure is maintained thereon by the mold. The curing is primarily by heat. The curing time can be in the order of minutes and the curing temperature will depend on the curing time with a high temperature for a short curing time and a low temperature for a long curing time. For example, a curing time of 3½ minutes at a temperature of 313° F. has been found to be well suited in general.

In order to provide greater strength or body to the shaped articles, multiple plies of the fleece can be utilized in providing the shaped structures, so that a laminated structure is produced. The individual layers of a multiple ply construction can be and preferably are combined at the time of molding. If desired, however, the layers can be combined prior to molding by utilization of a suitable adhesive. If combined at the time of molding, the plural layers used can be placed in the mold as a stack and the curing heat and pressure can be utilized to effect a joining together of the layers.

EXAMPLES

In the examples summarized in the following table a fleece of the following composition was needled so that it would retain its form during the impregnation and drying steps.

*Fleece composition*

|  | Pts. |
|---|---|
| Colored nylon waste | 50 |
| Green garnet | 30 |
| Viscose type 4 | 20 |
|  | 100 |

The weight of the fleece was 425 grams/m.$^2$. The needled fleece was impregnated with an aqueous medium containing the polymer composition by dip saturation between two steel rolls. The impregnated fleece was then dried. Where the proportions of binder were high, two dips, with intermediate drying, were used. Following aging for the period indicated in the table, a face mask was molded from the fleece. First the fleece was steamed for 30 seconds and it was then immediately pressed and heated in a mold, at 75 p.s.i. and 313° F., for 3½ minutes, the mask was then removed and allowed to cool to room temperature. All the products were satisfactory moldings, and withstood (maintained shape) exposure to steam for 1 minute, and also withstood soaking in water for 1 minute. Following the steam treatment or soaking the specimens were allowed to air dry overnight and no substantial alteration in shape or body occurred. Further, the molded articles were resistant to solvents. Thus samples 17 and 21 were shaken for 30 minutes in trichloroethylene and were quite resistant to attack, though corresponding uncured specimens were attacked to a significantly greater extent.

TABLE 1

| Sample No. | Binder | Formula No. | Fiber:Binder Ratio (Wt. Basis) | Age at Time of Testing |
|---|---|---|---|---|
| 1 | Dow QX 3705 | D-4 | 1:1 | 5 days. |
| 1A | do | D-4 | 1:1 | 1 month. |
| 2 | do | D-4 | 1:1 | 6 months. |
| 5 | do | D-4 | 1:2 | 5 days. |
| 6 | do | D-4 | 1:2 | 6 months. |
| 9 | Dow QX 3363.2 | D-5 | 1:1 | 4 days. |
| 10 | do | D-5 | 1:1 | 6 months. |
| 13 | do | D-5 | 1:2 | 4 days. |
| 13A | do | D-5 | 1:2 | 1 month. |
| 14 | do | D-5 | 1:2 | 6 months. |
| 17 | Hycar 1571 | BFG-1 | 1:1 | 0 days. |
| 18 | do | BFG-1 | 1:1 | 6 months. |
| 19 | do | BFG-1 | 1:1.5 | 0 days. |
| 20 | do | BFG-1 | 1:1.5 | 6 months. |
| 21 | 1571 + $Z_nO$ | BFG-2 | 1:1 | 0 days. |
| 21A | do | BFG-2 | 1:1 | 1 month. |
| 22 | do | BFG-2 | 1:1 | 6 months. |
| 23 | do | BFG-2 | 1:2 | 0 days. |
| 23A | do | BFG-2 | 1:2 | 1 month. |
| 24 | do | BFG-2 | 1:2 | 6 months. |

TABLE I—Continued

| Sample No. | Binder | Formula No. | Fiber:Binder Ratio (Wt. Basis) | Age at Time of Testing |
|---|---|---|---|---|
| 25 | Pliolite 440 | GL-1 | 1:1.5 | 0 days. |
| 25A | do | GL-1 | 1:1.5 | 1 month. |
| 26 | do | GL-1 | 1:1.5 | 6 months. |
| 27 | do | GL-1 | 1:2 | 0 days. |
| 27A | do | GL-1 | 1:2 | 1 month. |
| 28 | do | GL-1 | 1:2 | 6 months. |
| 29 | Pliolite 440 + ZnO | GL-2 | 1:1.5 | 0 days. |
| 29A | do | GL-2 | 1:1.5 | 1 month. |
| 30 | do | GL-2 | 1:1.5 | 6 months. |
| 31 | do | GL-2 | 1:2 | 0 days. |
| 31A | do | GL-2 | 1:2 | 1 month. |
| 32 | do | GL-2 | 1:2 | 6 months. |
| 33 | Tylac 3040 | TY-1 | 1:1 | 1 day. |
| 34 | do | TY-1 | 1:1 | 5 months. |
| 35 | do | TY-1 | 1:2 | 1 day. |
| 36 | do | TY-1 | 1:2 | 5 months. |
| 37 | Tylac 3046 | TY-2 | 1:1 | 1 day. |
| 38 | do | TY-2 | 1:1 | 5 months. |
| 39 | do | TY-2 | 1:2 | 1 day. |
| 40 | do | TY-2 | 1:2 | 5 months. |
| 41 | Tylac 5040 | TY-3 | 1:1 | 1 day. |
| 42 | do | TY-3 | 1:1 | 5 months. |
| 43 | do | TY-3 | 1:2 | 9 days. |
| 44 | do | TY-3 | 1:2 | 5 months. |
| 45 | Pliolite 460 | GL-3 | 1:1.5 | 0 days. |
| 46 | do | GL-3 | 1:1.5 | 5 months. |
| 47 | do | GL-3 | 1:1.5 | 0 days. |
| 48 | do | GL-3 | 1:1.5 | 5 months. |
| 49 | Pliolite 460 + ZnO | GL-4 | 1:2 | 1 day. |
| 49A | do | GL-4 | 1:2 | 4 months. |
| 51 | do | GL-4 | 1:2.5 | 1 day. |
| 51A | do | GL-4 | 1:2.5 | 4 months. |
| 53 | Ucar 890 | UL-890 | 1:1.5 | 0 days. |
| 53A | do | UL-890 | 1:1.5 | 4 months. |
| 55 | do | UL-890 | 1:2 | 0 days. |
| 55A | do | UL-890 | 1:2 | 4 months. |
| 57 | Hycar 2671 | BFG-3 | 1:1.5 | 0 days. |
| 57A | do | BFG-3 | 1:1.5 | 4 months. |
| 59 | do | BFG-3 | 1:2 | 0 days. |
| 59A | do | BFG-3 | 1:2 | 4 months. |
| 67 | Tylac 3540 | TY-4 | 1:2 | 6 days. |
| 68 | do | TY-4 | 1:2 | 3 months. |
| 69 | do | TY-4 | 1:3 | 6 days. |
| 70 | do | TY-4 | 1:3 | 5 months. |
| 71 | Good-rite 2570 x 5 | HY-1 | 1:1.5 | 1 day. |
| 72 | do | HY-1 | 1:1.5 | 5 months. |
| 73 | do | HY-1 | 1:2 | 1 day. |
| 74 | do | HY-1 | 1:2 | 5 months. |

Dow QX 3705 and Dow QX 3363.2 are carboxylated styrene butadiene latexes containing in the order of 40–50% solids, having a slightly alkaline pH, and containing stabilizer and antioxidant. They are available from Dow Chemical Company. Hycar 1571 is a similar latex wherein the polymer is a carboxy modified butadiene acrylonitrile. It is available from B. F. Goodrich Chemical Company. Where zinc oxide is used it is in the order of about 5% by weight of the polymer in the latex. The Pliolite 440 and Pliolite 460 are similar latexes wherein the polymer is carboxylated styrene butadiene. Zinc oxide where used is in the order of 5% by wt. of the polymer. Pliolite latexes are available from Goodyear Tire and Chemical Company. Tylac 3040 and Tylac 3046 are carboxyl modified butadiene styrene latexes having a bound styrene of 46%. Tylac 3540 is a carboxylate butadiene styrene copolymer with a bound styrene of 62%. Tylac 5040 is a carboxylated copolymer of butadiene and acrylonitrile. It has a medium nitrile level. The Ucar 890 is a self-curing latex of acrylic latex, of composition similar to the other latexes described above. The Hycar 2671 is a similar latex wherein the polymer is a carboxyl acrylic polymer, and formerly available from B. F. Goodrich Chemical Company. Good-rite 2570 x 5 is a modified carboxylic butadiene styrene latex available from B. F. Goodrich Chemical Co.

The formulae referred to in the table are as follows. In these formulae the 2% Keltex is a 2% aqueous solution of sodium alginate available from Kelco Company. It is used as a thickener and permits improved control of pick up of the latex by the fleece. The 50% zinc oxide is a 50% by wt. aqueous solution of zinc oxide containing about 0.5% by wt. of 26% ammonia and about 1.5% by wt. of Darvan No. 1, a dispersing agent for latex compounding available from the R. T. Vanderbilt Co. The 40% potassium hydroxide is a 40% by wt. potassium hydroxide aqueous solution.

The specific binder formulation as noted in Table 1 are as follows:

D-4

| | Gms. |
|---|---|
| Dow QX 3705 | 100 |
| 2% Keltex | 19 |
| | 119 |

D-5

| | |
|---|---|
| Dow QX 3363.2 | 100 |
| 2% Keltex | 19 |
| | 119 |

BFG-1

| | |
|---|---|
| Hycar 1571 | 1721 |
| 2% Keltex | 214 |
| | 1935 |

BFG-2

| | |
|---|---|
| Hycar 1571 | 2000 |
| 50% zinc oxide | 80 |
| 2% Keltex | 214 |
| | 2294 |

50% zinc oxide

| | |
|---|---|
| Zinc oxide | 250 |
| Darvan #1 | 7.5 |
| Water | 240 |
| Ammonia (26%) | 2.5 |
| | 500 |

GL-1

| | |
|---|---|
| Pliolite 440 | 2000 |
| 2% Keltex | 250 |
| | 2250 |

GL-2

| | |
|---|---|
| Goodyear Pliolite 440 | 1536 |
| 40% potassium hydroxide | 5 |
| 50% zinc oxide | 80 |
| 2% Keltex | 201 |
| | 1822 |

TY-1

| | |
|---|---|
| Tylac 3040 | 2000 |
| 2% Keltex | 125 |
| | 2125 |

TY-2

| | |
|---|---|
| Tylac 3046 | 2000 |
| 2% Keltex | 140 |
| | 2140 |

TY-3

| | |
|---|---|
| Tylac 5040 | 2000 |
| 2% Keltex | 165 |
| | 2165 |

GL-3

| | |
|---|---|
| Pliolite 460 | 2000 |
| 2% Keltex | 250 |
| | 2250 |

GL-4

| | |
|---|---|
| Pliolite 460 | 1536 |
| 40% potassium hydroxide | 5 |
| 50% zinc oxide | 80 |
| 2% Keltex | 201 |
| | 1822 |

UL-890

| | |
|---|---|
| Ucar 890 | 2000 |
| 2% Keltex | 100 |
| | 2100 |

BFG-3

| | |
|---|---|
| Hycar 2671 latex | 2000 |
| 2% Keltex | 250 |
| | 2250 |

TY-4

| | |
|---|---|
| Tylac 3540 | 2000 |
| 2% Keltex | 200 |
| | 2200 |

HY-1

| | |
|---|---|
| Hycar 2570 x 5 | 2000 |
| 2% Keltex | 275 |
| | 2275 |

Other commercially available polymers which have been found to be suitable when used as were the polymers used in the foregoing examples are the carboxy modified butadiene acrylonitrile latexes Hycar 1572, Hycar 1570 x 20, the carboxy styrene butadiene latexes Hycar 2570 x 5, Hycar 2570 x 1, and the carboxy acrylic latex Hycar 2600 x 30, all produced by B. F. Goodrich Chemical Co.; the carboxylated butadiene styrene latex Tylac 3540, of International Latex Corporation.

Figure 2:
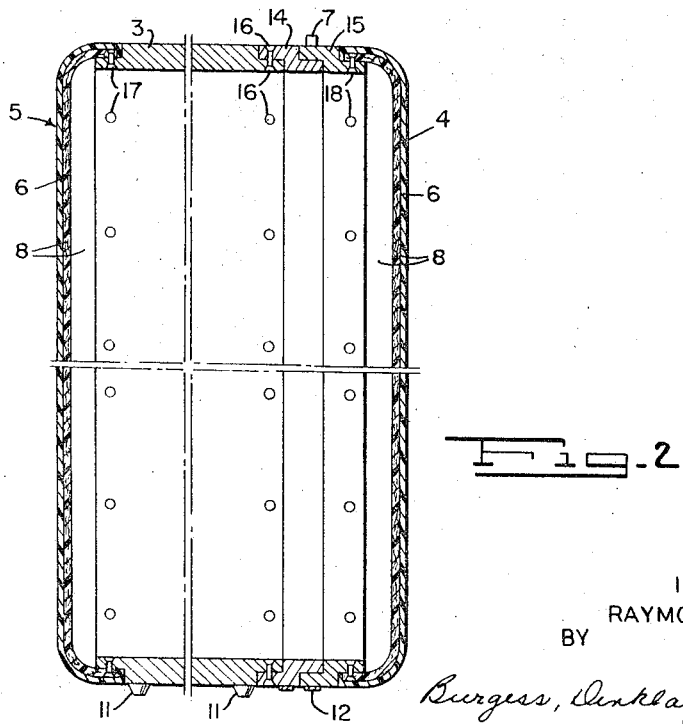

The invention is further described in the accompanying drawing, wherein:

FIG. 1 is a persepective view of a luggage case having a soft sided construction according to the invention; and FIG. 2 is a cross-sectional view taken along line 2—2 in FIG. 1.

Referring to the drawing, the luggage case includes a generally rectangular center piece 3 and side walls 4 and 5. The center piece 3 can be of rigid construction, and can be formed of, for example, plywood, plastic, or metal. The side walls 4 and 5 are each shaped articles comprising a foundation 8 and a plastic covering 6. Each of the foundations 8 is a fleece containing heat cured resin according to the invention, the resin serving to bind the fleece fibers together and as a stiffening agent so that the foundation, which is in one piece, is shape-retaining. The foundation can be formed as is described in the examples and the plastic covering can be a thermoplastic vinyl film which has been vacuum formed in known manner to the shape of the foundation. The film can be secured to the foundation with any suitable adhesive.

The peripheral edge portions of the side wall 4 are secured to a metal frame 15 by rivets 18. A complementary frame member 14 is secured to the center piece 3 by rivets 16. The frame member 15 and the frame member 14 are hinged together by hinge 12 and mate in known manner to provide a tight closing for the luggage case. The frame members can be of metal. The side wall 5 is secured to the center piece 3 by rivets 17. The luggage case is outfitted with locks 7 and 9 and handles 10 and the stands 11.

Luggage cases according to the invention are characterized in that they include a shaped side wall which is yieldable, flexible, and shape-retaining and includes a one piece foundation having the shape of the side wall and made up of a non-woven filamentary fleece containing a heat cured polymer which, according to the invention, serves as a binder for the fleece filaments and as a stiffening agent imparting the shape of the foundation thereto.

Percentages herein are weight percent unless otherwise indicated.

While the invention has been described in detail with reference to its application for the production of luggage shells, it is well suited for other uses, for example, for the production of soft box toes, molded insoles, and shoe uppers.

What is claimed is:

1. Luggage case comprising a soft shaped side wall which is yieldable, flexible, and shape-retaining and comprising a one-piece foundation of the shape of the side wall and consisting essentially of a non-woven filamentary fleece containing a heat cured polymer serving as a binder for the fleece filaments and as a stiffening agent imparting the shape of said foundation thereto, said polymer being of an unsaturated carboxylic acid, an aliphatic conjugated diolefin, and a monomer selected from the group consisting of alkenyl aromatic monomers, acrylonitrile, and alkyl substituted acrylonitrile.

2. A luggage case according to claim 1, the binder being about 10–90 wt. percent of the fleece and binder.

3. A luggage case according to claim 1, said binder being a heat cured polymer of an unsaturated carboxylic acid, butadiene, and a monomer selected from the group consisting of styrene and acrylonitrile.

4. A luggage shell as claimed 1, wherein said fleece has a fiber weight of about 40 to 500 grams per square meter.

5. Method of producing a luggage shell which comprises providing a non-woven filamentary fleece; impregnating said fleece with an aqueous dispersion of a copolymer of an unsaturated carboxylic acid, an aliphatic conjugated diolefin, and a monomer selected from the group consisting of alkenyl aromatic monomers, acrylonitrile, and alkyl-substituted acrylonitrile; drying said fleece and simultaneously depositing said polymer on the fibers thereof; pressure-forming said impregnated, dried fleece to a desired luggage shell shape; and heat-curing said polymer while maintaining said forming pressure.

6. Method as claimed in claim 5, wherein said dried fleece is steamed prior to said pressure-shaping.

7. Method as claimed in claim 5, wherein said dried fleece is stored prior to said pressure-shaping.

8. Method as claimed in claim 7, wherein said dried fleece is steamed prior to said pressure-shaping.

References Cited

UNITED STATES PATENTS

| 2,782,889 | 2/1957 | Eber | 190—28 |
| 2,963,744 | 12/1960 | Cooper | 264—137 X |
| 3,098,548 | 7/1963 | Bialo | 190—53 X |
| 3,207,274 | 9/1965 | Baermann | 190—53 |
| 3,256,234 | 6/1966 | Miller | 260—80.7 X |

FOREIGN PATENTS 439,046  11/1935  Great Britain.

FRANKLIN T. GARRETT, *Primary Examiner.*